March 3, 1959   P. C. NELSON   2,875,733
POWER DRIVEN TOOLS

Filed June 18, 1956

INVENTOR.
PAUL C. NELSON
BY
Caswell & Lagaard
ATTORNEYS

FIG. 2

INVENTOR.
PAUL C. NELSON

FIG. 3

INVENTOR.
PAUL C. NELSON
BY
Caswell & Lagaard
ATTORNEYS

March 3, 1959

P. C. NELSON

2,875,733

POWER DRIVEN TOOLS

Filed June 18, 1956

INVENTOR.
PAUL C. NELSON
BY
Caswell & Lagaard
ATTORNEYS

March 3, 1959

P. C. NELSON 2,875,733

POWER DRIVEN TOOLS

Filed June 18, 1956

INVENTOR.
PAUL C. NELSON
BY
Caswell & Lagaard
ATTORNEYS

United States Patent Office 2,875,733
Patented Mar. 3, 1959

2,875,733
POWER DRIVEN TOOLS

Paul C. Nelson, Lake City, Minn., assignor to O'Neil-Irwin Manufacturing Company, Lake City, Minn., a corporation of Minnesota Application June 18, 1956, Serial No. 592,184

7 Claims. (Cl. 121—38)

The herein disclosed invention relates to power driven tools such as hydraulic presses, brakes, and similar devices used for working on sheet metal and having a ram movable toward and from a bed.

An object of the invention resides in providing a power driven tool in which power for the ram is applied without the use of gearing or other reduction transmission.

Another object of the invention resides in providing a tool in which considerably greater pressure can be had at the end of the working stroke than throughout the major portion thereof.

A still further object of the invention resides in providing a tool in which the speed may be manually adjusted to cause the ram to move in accordance with the requirements.

An object of the invention resides in providing a tool in which the terminal positions of the ram may be manually controlled.

Another object of the invention resides in providing a construction in which the ram travels at a relatively high rate of speed throughout the first part of its power stroke and throughout the entire return stroke and at a lesser rate of speed at the end of the power stroke.

A feature of the invention resides in providing a tool in which the point of change in speed can be manually adjusted.

Other objects of the invention reside in the novel combination and arrangement of parts and in the details of construction hereinafter illustrated and/or described.

The invention consists of a frame A which comprises two vertical side frame members 10 and 11 constructed of plate steel and cut to the form shown. These frame members are secured together at their upper ends by means of two transverse rods 12. The ends 20 of these rods are reduced in diameter and extend through said frame members and nuts 13 are screwed on the ends of said rods to hold the parts in position. At the lower ends of the frame two crossbars 14 are employed. These bars are secured to said frame members by means of cap screws 15. A shelf 16 extends across said frame members and rests upon the crossbars 14 and is similarly secured thereto. Intermediate the upper and lower ends of the frame are two other crossbars 17 which are similarly attached to the frame members 10 and 11 and have secured to them a guard 18 which covers and protects certain of the operating mechanism of the tool situated below the same.

Overlying the forward edges 19 of the frame members 10 and 11 is a bed B which consists of two spaced plates 22 and 23. These plates are held separated from one another by means of bars 24 and 25 situated at the upper and lower edges of said plates. These bars have tongues 26 extending between said plates and which hold the same in spaced relation. The said bars may be welded or otherwise secured to the plates 22 and 23 so that the entire bed B will move as a unit. Cap screws 27 extend through slots 28 in said plates and are screwed into the plates 10 and 11 at the edges 19 thereof. These cap screws hold the bed B in proper adjusted position with reference to the frame A. The bar 24 is formed with a groove 29 in which may be mounted different tools for use with the machine. In the drawings a bar 31 with a V groove for forming bends has been shown. The bed B may be raised and lowered by means of a raising device 32 which, forming no particular feature of the invention, will not be described in detail.

Situated above the bed B is a ram C. This ram consists of a transverse bar 33 which has welded to it at its ends two bosses 34. These bosses slide on vertical guides 35 welded to lugs 36 extending outwardly from the forward edges of the frame members 10 and 11. The foremost end of the bar 33 is formed with a clamp 37 by means of which various types of tools may be attached to the ram. In the drawings a bar 38 has been shown which is formed with a V-shaped point adapted to cooperate with the bar 31 to bend sheet material inserted therebetween. A gage 39 has been shown in the drawings and which may be manually adjusted to determine the position of the bend. This gage, forming no particular feature of the instant invention, will not be described in detail.

The ram C is operated by means of two eccentrics or cranks 41 attached to a shaft 42. Shaft 42 is journaled in bearings 40 mounted in the vertical frame members 10 and 11. Eccentric straps or connecting rods 43 are formed with bores 44 which receive said eccentrics and are further pivoted to pins 46 welded to lugs 45 on the bar 33 of the ram. As the shaft 42 turns the eccentrics 41 are correspondingly turned and the eccentric straps 43 raise and lower the ram C.

The shaft 42 forms part of a hydraulic motor D which includes a case 47 having a center section 49 formed with a cylindrical bore 48. Shaft 42 extends centrally through this section of the case. The case is further formed with end walls 51 bolted to the said case by means of cap screws 52. These end walls have bearings 53 in which the shaft 42 is journaled. The case 47 is held from rotation relative to the frame A by means of ears 54 formed on the end walls 51 and through which the rods 12 previously referred to extend. By means of the construction specified, an annular chamber 55 is formed within the bore 48 of the case 47 and which is divided into two compartments 56 and 57 by means of a partition 58 secured to the center section 49 and a piston 59 secured to the shaft 42. The shaft 42 may rotate until the piston 59 reaches the partition 58 on opposite sides thereof. During such movement the eccentric 41 raises and lowers the ram C.

Figure 10:
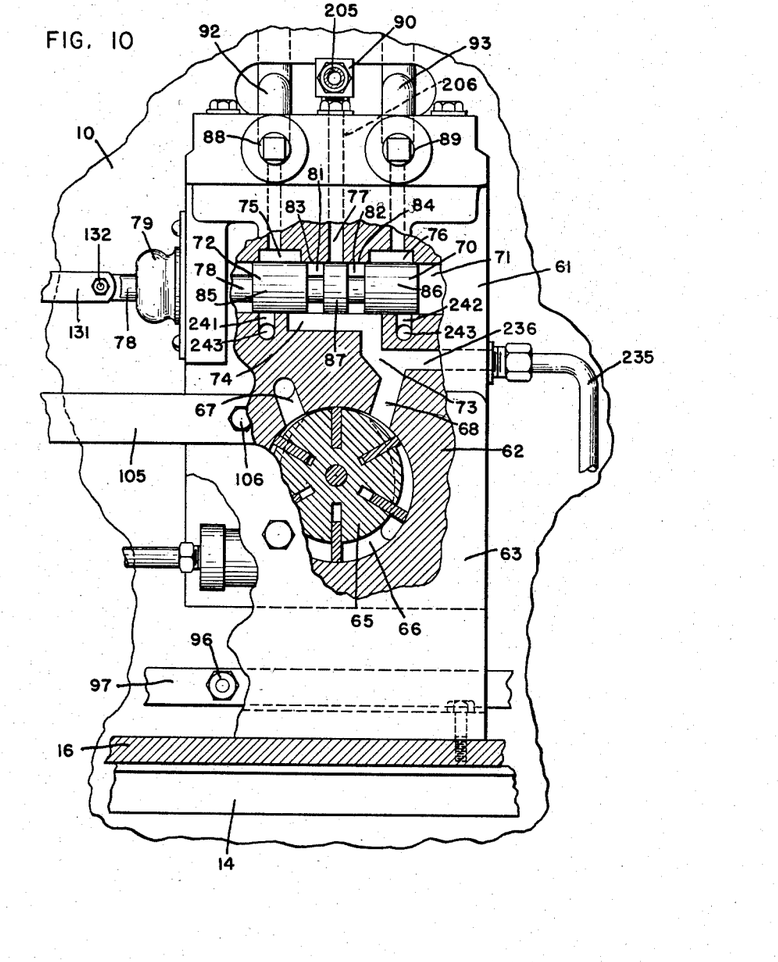
Fig. 10 is a vertical elevational view, partly in section, of the pump and valve mechanism therefor.

For the purpose of operating the motor D, a pump 61 is employed, which is provided with a body 62. A bracket 63 is attached to this body by means of cap screws 60 and has a flange 64 which is bolted to the shelf 16. This pump includes a vane-type rotor 65 operable in a chamber 66 having an inlet 67 and an outlet 68. The inlet 67 is connected to an oil reservoir 69 and which is bolted to the body 62. Rotor 65 is driven by a motor 50 mounted on shelf 16. The pump also has a valve mechanism 70 formed in the body 62. This valve mechanism includes a bore 71 which is horizontal and in which is slidably mounted a valve member 72. The body 62 is formed with a passageway 73 which communicates with the outlet 68 of the pump and which also communicates with a manifold port 74. This port is in communication with the bore 71 on the lower side thereof. The body 62 is further formed with three other ports 75, 76 and 77, also communicating with the bore 71 but on the upper side thereof. These ports are spaced from one another to form lands 83 and 84 therebetween. The body 62 is further formed with ports 241 and 242 which are disposed opposite the outer ends of the ports 75 and 76 and which communicate with the bore 71 on the under side thereof. These ports communicate with passageways 243 which lead to the reservoir 69. The valve member 72 is formed with a valve rod 78 which passes through a gland 79 attached to the body 62. The said valve member fits snugly within the bore 71 of the valve and is formed with two grooves 81 and 82 which, when the valve member is in the central position, lie opposite the lands 83 and 84. By means of these grooves the valve member is formed with port closures 85, 86 and 87, the closures 85 and 86 being at the ends of the valve member and the closure 87 therebetween. When the valve member is in central position, as shown in Fig. 10, the closures 85, 86 and 87 lie opposite the ports 75, 76 and 77 and block the flow from the manifold 74 to any of these three ports and also isolate ports 241 and 242 from ports 75, 76 and 77.

The body 62 is provided with connectors 88, 89 and 90 which communicate with the ports 75, 76 and 77. Connectors 88 and 89 have connected to them pipes 92 and 93 which are connected to connectors 94 and 95 on the motor case 47 and which communicate with the two compartments 56 and 57 respectively.

Figure 1:
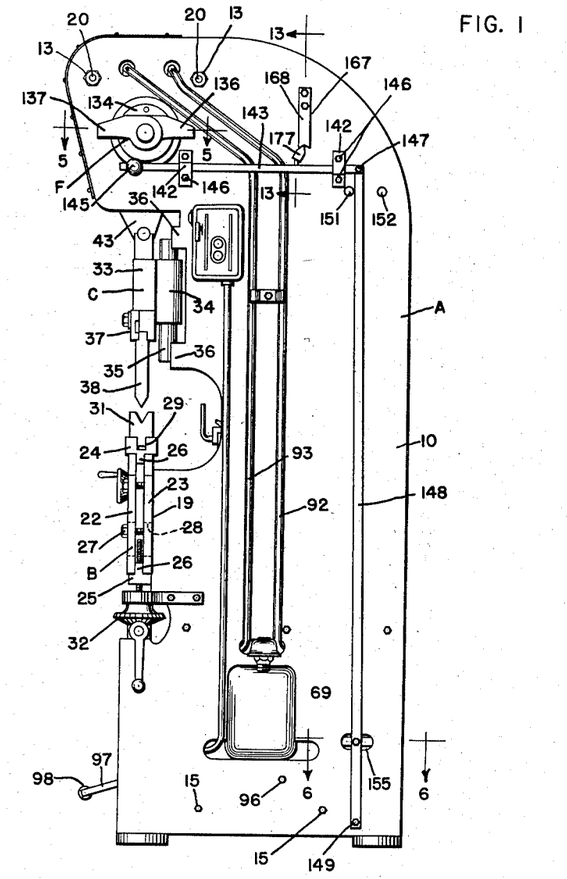
Fig. 1 is a side elevational view of a power driven tool illustrating an embodiment of the invention.
Figure 2:
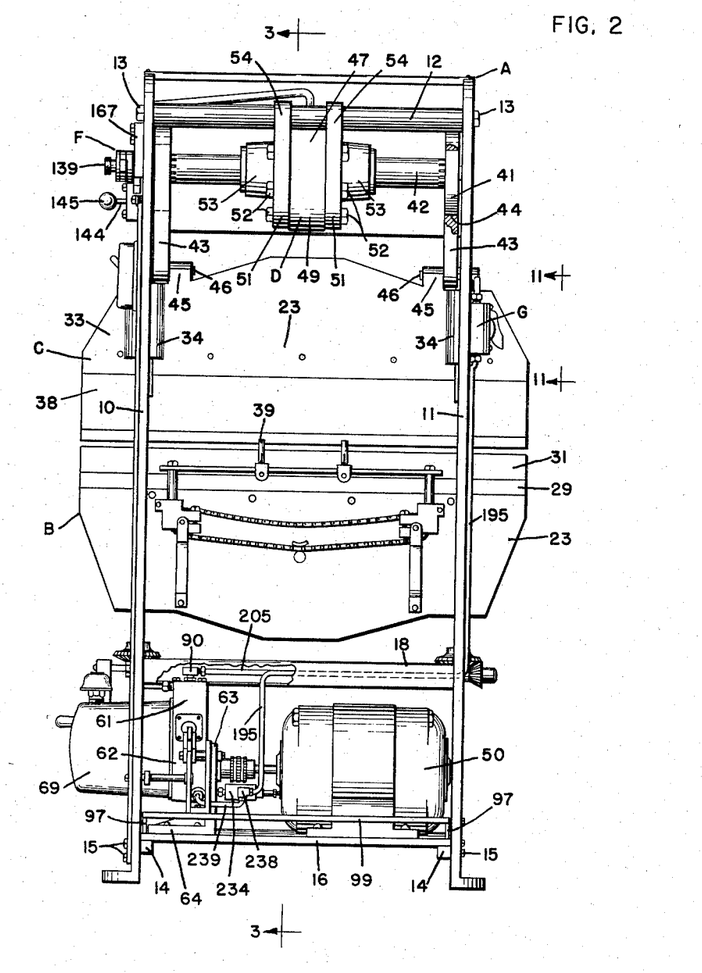
Fig. 2 is a rear view of the structure shown in Fig. 1.
Figure 3:
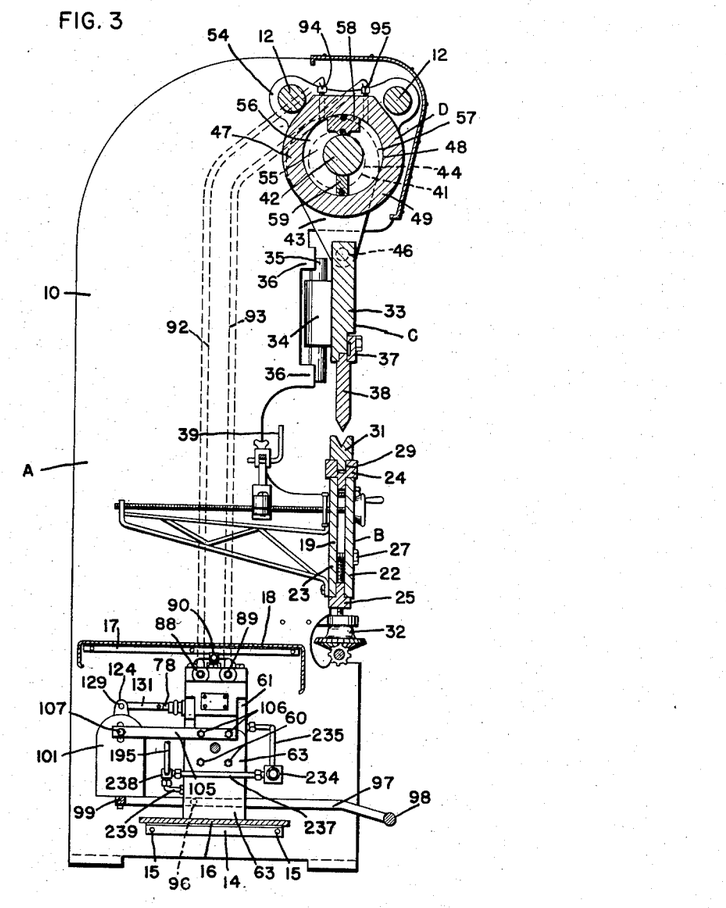
Fig. 3 is a vertical elevational-sectional view taken substantially on line 3—3 of Fig. 2.
Figure 4:
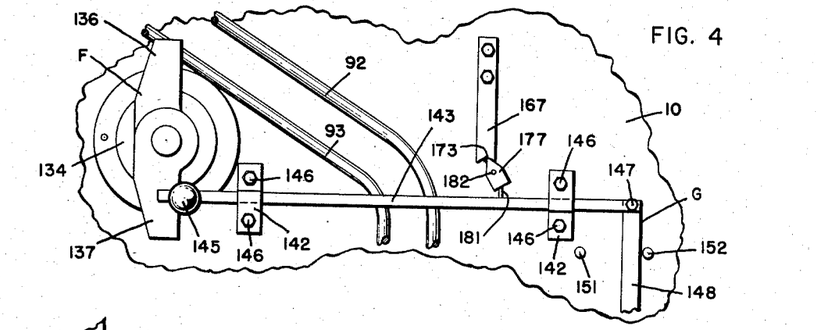
Fig. 4 is a fragmentary elevational view of the terminating means of the invention shown in Fig. 1 and illustrating the parts in altered position, said view being drawn to a greater scale.
Figure 5:
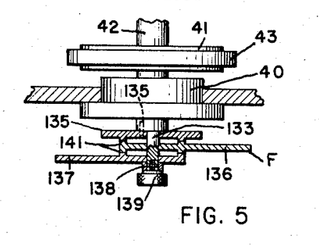
Fig. 5 is a fragmentary plan sectional view taken on line 5—5 of Fig. 1 and drawn to the same scale as Fig. 4.
Figure 6:
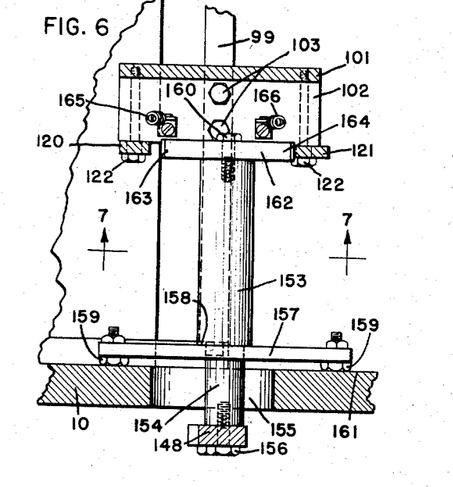
Fig. 6 is a plan sectional view of the reversing means taken on line 6—6 of Fig. 1 and drawn to a greater scale.

The valve rod 78 is operated by actuating means indicated by the reference character E constructed as follows: Pivoted to the vertical frame members 10 and 11 near the lowermost portion thereof and by means of cap screws 96 are two starting levers 97. These levers have welded to the forward portions of the same an elongated pedal 98 by means of which the levers may be depressed and at the rearward portions of the same a transverse bar 99. Bar 99 has secured to it a shuttle 101 shown in detail in Figs. 3, 6 and 7. This shuttle has a base 102 which overlies the bar 99 and which is secured thereto by means of cap screws 103. The upper portion of the shuttle 101 is formed with a vertical elongated slot 104. It will readily be comprehended that the shuttle 101 travels with the levers 97 and can be raised and lowered as the pedal 98 is depressed and released.

Figure 9:
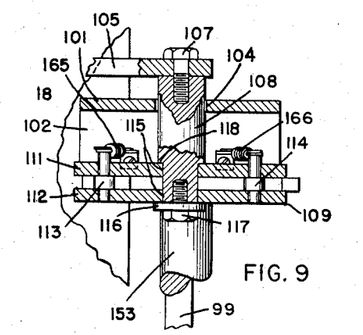
Fig. 9 is a plan sectional view taken on line 9—9 of Fig. 7.

Attached to the bracket 63 and extending rearwardly thereof and at a position overlying the shuttle 101 is a bar 105. This bar is attached to the bracket 63 by means of cap screws 106. This bar has secured to it by means of a cap screw 107 a stud shaft 108 (see Fig. 9). The shaft 108 passes through the slot 104 in the shuttle 101 and permits the shuttle to be raised and lowered as the pedal 98 is manipulated. Rotatably mounted on the stud shaft 108 is a triple arm lever 109. This lever consists of two plates 111 and 112, identical in construction, and held in spaced relation by means of two spacers 113 and 114. These plates are bored as indicated at 115 to rotate on the shaft 108. A washer 116 overlying the outer end of the stud shaft 108 is secured thereto by means of a cap screw 117 and which engages the plate 112. Plate 111 butts up against a shoulder 118 on the shaft 108 and the said shoulder and washer hold the lever 109 from endwise movement on the shaft. The lever 109 is provided with an upstanding valve operating arm 124 and two actuating arms 125 and 126 which extend in opposite directions transversely of the direction of movement of the shuttle. The spacers 113 and 114 are disposed on the arms 125 and 126 and serve as abutments for a purpose to be presently described.

Pivoted to the forward end of the base 102 of shuttle 101 are two connector levers 120 and 121. Cap screws 122 extend through the lower ends of these levers and are screwed into the base 102 and serve as pivots therefor. These levers move freely between the two plates 111 and 112 of the triple arm lever 109 and are formed with shoulders 123 which serve as abutments on said levers and which are adapted to engage the abutments formed by the spacers 113 and 114 on the arms 126 and 127 of said lever. A spring 127 is connected to said arms and moves the arms toward one another. Lugs 128 on the ends of the levers 120 and 121 limit the inward movement of said levers. The valve operating arm 124 of the triple arm lever 109 has pivoted to it by means of a pintle 129 a link 131. This link in turn is pivoted by means of a pintle 132 to the valve rod 78. When the lever 109 is operated, valve member 72 is moved to control the operation of the ram as will hereafter be more fully described.

The termination of the movement of the ram is procured by terminating means F best shown in Figs. 1, 2, 4 and 5. The end of the shaft 42 on which the eccentrics 41 are mounted extends outwardly beyond the frame member 10 and is formed with a reduced portion 133. Mounted on this reduced portion is an index plate 134 which has markings thereon for the purpose of setting the device but which have not been shown on the drawings. This plate is held from movement relative to the shaft 42 by means of a dowel pin 135 which extends through said plate and into the shaft proper. Mounted on the reduced portion 133 adjacent to the plate 134 is a finger 136 which extends outwardly beyond the plate 134. A similar finger 137 is mounted on the reduced portion 133 and extends outwardly beyond the finger 136. Encircling the extreme end of the said reduced portion of the shaft is a sleeve 138, and screwed into the end of the shaft is a thumb screw 139 which engages said sleeve and urges the parts together. Serrations 141 on the facing surfaces of the plate 134 and the finger 136 and the facing surfaces of the fingers 136 and 137 hold the parts from relative rotation after the fingers have been properly adjusted.

Slidably mounted on the end frame member 10 in guides 142 is a shifter rod 143. This rod has secured to one end of it a pin 144 which lies in the path of movement of the fingers 136 and 137, and which serves as engaging means for engagement with said fingers. This pin has a knob 145 secured to the outer end of the same and by means of which the said rod may be manually shifted. The guides 142 are attached to the side frame member 10 by means of cap screws 146. The other end of the rod 143 has pivoted to it by means of a cap screw 147 a long vertical lever 148 which is pivoted at its lower end by means of a cap screw 149 to said frame member. This lever operates between stops 151 and 152 secured to said frame member. Attached to this lever near its lower end is a short stud 153. This stud has a reduced portion 154 which passes through a slot 155 in said frame member. The lever 148 is secured to the reduced portion 154 of stud 153 by means of cap screw 156 which extends through said lever and is screwed into the end of said reduced portion. The reduced portion 154 of stud 153 has mounted on it a bar 157 which butts up against the shoulder 158 formed between said stud and the reduced portion. This bar has sliders 159 at the ends of the same which engage the inner surface 161 of the end frame member 10 and which guide the stud 153 for back and forth movement in the slot 155. The bar 157 may be pressed on the extension 154 or rigidly secured thereto in any other suitable manner. Attached to the inner end of the stud 153 by means of a cap screw 160 is a bar 162, the ends of which are curved to form two shifters 163 and 164. The shifters 163 and 164 are adapted to engage the connector levers 120 and 121 and to move the same so as to bring the abutments 123 of the connector levers 120 and 121 out of engagement with the abutments 113 and 114. Two coil springs 165 and 166 acting between the actuating arms 125 and 126 of the triple arm lever 109 serve to urge said lever into the position shown in Fig. 7 and in which the valve member 72 is in its intermediate position as shown in Fig. 10 to cut off the flow of fluid to or from the compartments 56 and 57 of the motor D. The striple arm lever 109, the connector levers 120 and 121 and the shifters 163 and 164 and the associated structure forms a reversing means indicated by the reference character H.

Figure 13:
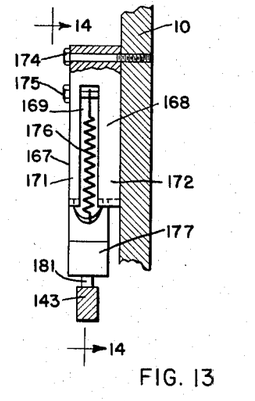
Fig. 13 is a fragmentary elevational-sectional view of the over-center device taken on line 13—13 of Fig. 1 and drawn to a greater scale.
Figure 14:
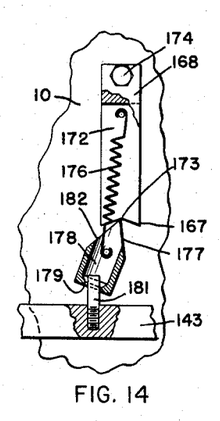
Fig. 14 is an elevational-sectional view of the structure shown in Fig. 13 and taken substantially on line 14—14 of Fig. 13.

The bar 162 is urged into and held in either of its extreme positions by means of an over-center device 167 shown in detail in Figs. 13 and 14. This device consists of a block 168 of metal which is formed with a slot 169 extending substantially throughout the length of the same. By means of this construction, two parallel arms 171 and 172 are formed which are constructed with V-notches 173 at the ends of the same. A cap screw 174 extends through this block and is screwed into the end frame member 10 of the frame A. A similar cap screw 175 extends through the two arms 171 and 172 and is likewise screwed into the end frame member 10. This cap screw extends through the slot 169 and forms a spring anchor for one end of a tension coil spring 176. Cooperating with the notches 173 in the ends of the arms 171 and 172 is a V-shaped block 177 which has a hole 178 drilled in the same in the pointed end thereof. This hole is reduced in diameter at the extreme end of the block as indicated by the reference numeral 179 to receive a pin 181 projecting upwardly from the shifter rod 143. A pin 182 extending transversely through the block 168 and through the hole 178 forms a spring anchor for the other end of the spring 176. When the rod 143 is moved by either of the fingers 136 or 137 and the pin 181 passes the crotch of the notch 173, the spring 176 urges the rod 143 to continue to travel and to move the valve member shifters 163 with snap action into either of their extreme positions.

Figure 11:
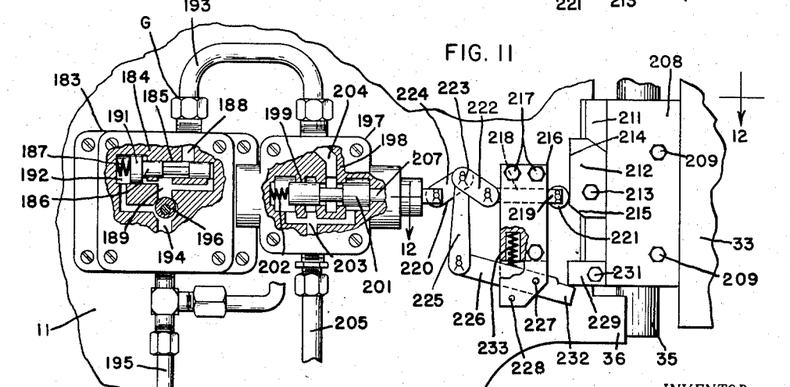
Fig. 11 is an elevational view of a portion of the by-pass circuit of the invention with portions broken away and viewed substantially on line 11—11 of Fig. 2 and drawn to a greater scale.
Figure 12:
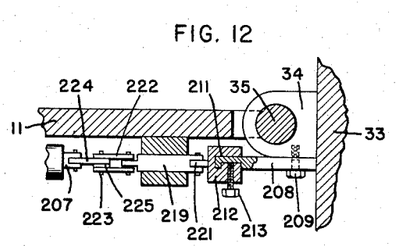
Fig. 12 is a fragmentary plan sectional view of a portion of the structure shown in Fig. 11 and taken on line 12—12 of Fig. 11.

For the purpose of controlling the rate of travel of the ram, a by-pass circuit designated by the reference character G is employed. This circuit by-passes a portion of the fluid pumped by the pump 61 thus reducing the rate of flow to the motor D and varying the rate of travel of the ram. For the purpose, a flow control valve 183 is employed which has a body 184 provided with a bore 185. A plunger 186 travels in this bore and is urged toward one end by means of a compression coil spring 187. Ports 188 and 189 communicate with said bore. At the end of the plunger 186 is a piston 191 which travels in a cylinder 192. An intake pipe 193 is connected to the body 184 and communicates with the port 188. The body 184 is formed with a passageway 194 which is connected by means of a pipe 195 to the tank 69 of the pump 61. In the passageway 94 is provided a flow restrictor 196 which may be manually operated to control the rate of flow from the pipe 193 to the pipe 195. Operating in conjunction with the flow control valve 183 is a shut-off valve 197. This valve has a body 198 formed with a bore 199. A plunger 201 is slidable in this bore and is urged into normally closing position by means of a compression coil spring 202. The body 197 is formed with an inlet port 203 and an outlet port 204. Pipe 193 is connected to the outlet port 204 while a pipe 205 connects the port 203 with a passageway 206 in the body 62 of the pump 61 and which communicates with the port 77 of said pump. The valve 197 has an operating rod 207 which extends outwardly therefrom. The valve 197 is operated by means of a cam and linkage mechanism, best shown in Figs. 11 and 12. A guide plate 208 is secured to one of the bosses 34 which guides the ram D for vertical movement. Cap screws 209 pass through this guide plate and are screwed into said boss. The guide plate 208 overlies a portion of the end frame member 11 and is spaced therefrom. The guide plate 208 has a vertically extending groove 211 formed in the outer face thereof. Slidably mounted on the guide 208 is a cam 212 and a set screw 213 serves to position the said cam at any desired elevation along the said guide. The cam 212 has a vertical cam surface 214 and an inclined cam surface 215. A support 216 is secured to the end frame member 11 by means of cap screws 217. This support has a transverse bore 218 which slidably receives a push rod 219. A roller 221 pivoted to the end of said push rod is adapted to engage the cam 212 and to travel along the cam surfaces 215 and 214 thereof. This push rod is pivotally connected to a link 222 which in turn is pivoted by means of a pintle 223 to another link 224. Link 224 is in turn pivoted to the valve rod 207 of valve 197. These links provide a toggle linkage 220 between rods 219 and 207. Another link 225 is pivoted on the pintle 223 and also to one end of a lever 226. Lever 226 is pivoted to the lower end of the support 216 by means of a pintle 227. A stop 228, also secured to said support, limits the downward movement of said lever. Mounted on the guide plate 208 is pusher 229. This pusher is similarly constructed to the cam 212 and has a part sliding in the groove 211 of said guide plate. A cap screw 231 screwed into the said pusher fixes the position of the same with reference to the ram. The pusher 229 is adapted to engage a finger 232 extending outwardly from lever 226 and to swing said lever in a clockwise direction to raise the link 225 and break the toggle linkage 220 as shown in Fig. 11. A compression coil spring 233 acting on the lever 226 tends to move said lever in a counter clockwise direction and to bring the links of the toggle mechanism into alignment.

The pump 61 is adapted to be operated continuously. To dispose of the fluid pumped when the ram is not in operation, a relief valve 234 is employed, which is connected by means of a pipe 235 to a passageway 236 in the body 62 of the pump 61, and which communicates with the outlet 68 of said pump. This relief valve is connected by means of another pipe 237 with a T 238 and which in turn is connected by means of a pipe 239 to the reservoir 69 of the pump. The pipe 195, previously referred to, is also connected to the T 238 and the valve 183 is thus also in communication with reservoir 69.

*Operation*

Figure 7:
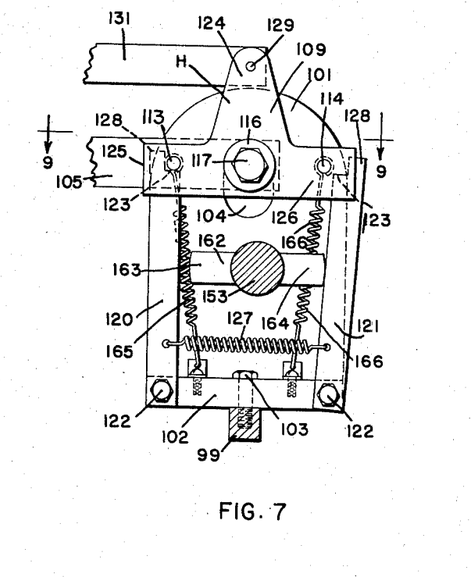
Fig. 7 is an elevational-sectional view of the structure shown in Fig. 6 and taken on line 7—7 of Fig. 6.
Figure 8:
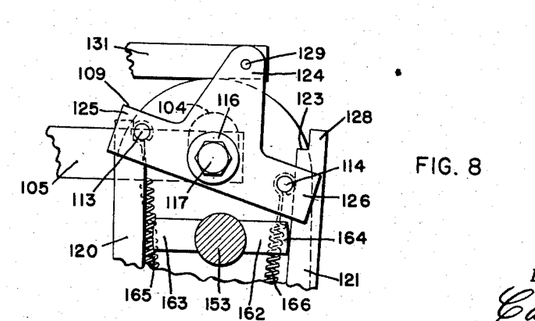
Fig. 8 is a view similar to Fig. 7 showing the parts in altered position.

The method of operation of the invention is as follows: In the drawings the ram C has been shown in an intermediate position. However, when the tool is in disuse, the ram is in its uppermost terminal position and the piston 59 is adjacent the partition 58 of motor D and to the left of the same as viewed in Fig. 3. Compartment 56 is now of minimum volume and compartment 57 of maximum volume, both being filled with fluid. When the valve member 72 is in its intermediate position as shown in Fig. 10, the ports 75, 76, 77, 241 and 242 are closed, and no fluid flows to the motor D or to the by-pass circuit G. At such time the entire output of the pump passes through the relief valve 234 and back into the reservoir 69. The roller 221 of the valve 197 is at a position between the cam 212 and the pusher 229 with the links 222 and 224 in alignment and with the shut-off valve 197 closed. No fluid can hence pass through the by-pass circuit G and the entire output of the pump is free to flow to the motor D after the valve member 72 has been shifted. The shuttle 101 is then in the position shown in Fig. 7 with the shifter 164 holding the connector lever 121 outwardly and clear of the spacer 114. When the parts are arranged as shown in Fig. 7, finger 137 attached to shaft 42 is in engagement with the pin 144 on shifter rod 143 and the said rod together with the over-center device 167 are in the position shown in Fig. 4. As soon as the pedal 98 is stepped on, starting levers 97 swing in a clockwise direction, as viewed in Fig. 3, and the shuttle 101 is moved upwardly. Abutment 123 on connector lever 120 engages the spacer 113 and swings the triple arm lever 109 in a clockwise direction, as viewed in Fig. 7, and to the position shown in Fig. 8. This moves the link 131 outwardly and shifts the valve member 72 toward the left as viewed in Fig. 10. The port 77 is now in communication with groove 82 of valve member 72 and also in communication with the manifold 74. The by-pass circuit G is now energized. At the same time port 75 is in communication with groove 81 and also with manifold 74. Also port 76 is in communication with port 242. The fluid then flows through pipe 92 and into compartment 56 and from compartment 57 through pipe 93 to reservoir 69. This causes the piston 59 to move away from partition 58 and the shaft 42 to turn in a counter clockwise direction. The ram now descends. Since the shut-off valve 197 in the by-pass circuit G is closed, all of the fluid enters compartment 56, and the ram travels downwardly at the maximum rate. Just before reaching its final position, cam 212 engages roller 221 and the links 222 and 224 being in alignment moves the valve rod 207 toward the left, as viewed in Fig. 11, and opens valve 197. Fluid now passes through the by-pass circuit and the amount of fluid so traveling is controlled by the flow control valve 183. The ram now travels for the remainder of its stroke at a slower speed depending upon the positioning of the flow restrictor 196. As soon as the pusher 229 engages finger 232 on lever 226, the said lever is swung in a clockwise direction and the toggle mechanism 220 broken. This causes the valve 197 to close and flow through the by-pass circuit G terminated. Springs 233 and 202 are so designed that with the lever advantage of spring 202 the toggle mechanism 220 remains broken after the abutment 229 leaves the finger 232. When, of course, the roller 221 passes off from the cam 212, spring 233 then returns the lever 226 to its normal position, and the roller 221 again drops into the space between the cam 212 and the pusher 229 with the links 222 and 224 moving into alignment. Valve 197 hence remains closed through the entire return stroke of the ram and the ram travels to its normal position at a rapid rate. As the ram moves in its power stroke, shaft 42 travels in a clockwise direction, as viewed in Fig. 4, and finger 136 moves toward pin 144. As soon as this finger strikes the pins it moves the shifter rod 143 to the left and the over-center device 167 as soon as the block 177 passes dead center quickly shifts the shifter rod 143 to the position shown in Fig. 14. This reverses the movement of the shifter bar 162 and causes the shifter 163 to disengage abutment 123 from spacer 113. Spring 165 now moves the triple arm lever 109 back to its normal position which returns valve member 72 to its intermediate position and stops motor D with the ram in its lowermost terminal position. When the shuttle 101 is lowered, connector lever 120 is held out of engagement with spacer 113 and the abutment 123 on lever 121 is drawn beneath the spacer 114. A succeeding pressure on the pedal 98 will then control the return movement of the ram since upward movement of the shuttle will cause connector lever 121 to actuate lever 109 and move valve member 72 in the opposite direction. It will readily be comprehended that the ram operates only as long as pedal 98 is depressed and its movement may be terminated intermediate its terminal positions by simply releasing said pedal and its movement again resumed upon again depressing said pedal. Also, the motion of the ram may be reversed manually before the end of its stroke by releasing pedal 98 and moving shifter rod 143 manually by means of knob 145.

The advantages of the invention are manifest. Extremely great pressure can be procured at the end of the power stroke without the use of gearing or similar types of power transmissions. The terminal positions of the ram can be readily adjusted and accurately determined. The operation of the power operated tool can be fully automatic or without readjustment and the same manually controlled. The speed of movement of the ram is readily controllable and the ram can be made to descend to within a short distance of the work at maximum speed, then travel to the end of its power stroke at a reduced rate of speed, and finally return to normal position at its maximum speed. The duration of the reduced rate of speed and the relative speeds can be readily varied to meet the requirements.

Changes in the specific form of the invention, as herein described, may be made within the scope of what is claimed without departing from the spirit of the invention.

Having described the invention, what is claimed as new and desired to be protected by Letters Patent is:

1. In a power driven tool having a ram, an oscillating shaft for operating said ram and a movable member for controlling the movement of said shaft, said movable member being movable from a position causing movement of said ram in one direction to a neutral position and to a position causing movement of the ram in the opposite direction, the combination of a linkage for operating said movable member including a connector connected to said movable member, guide means for said connector and guiding said connector for movement to bring said movable member into any of its positions, means controlled by human agency for causing movement of said connector from the neutral position of said movable member to either of its other positions, two angularly adjustable radial fingers connected to and movable with said shaft, said linkage further including a part guided for movement in the direction of movement of said fingers, one of said fingers when engaging said part terminating movement of the ram in one direction and the other of said fingers when engaging said part terminating movement of the ram in the opposite direction, and means operated by said shaft for reversing the direction of movement of said ram when the ram reaches either of its terminal positions.

2. In a power driven tool, a frame, a ram, guide means carried by said frame and guiding said ram for movement in opposite directions, a shaft journaled for oscillating movement in said frame, means acting between said shaft and ram and causing movement of said ram in opposite directions, a reversible fluid motor driving said shaft and connected to turn said shaft in opposite directions, fluid circulating means connected to said motor and to a source of fluid under pressure, valve means in said circulating means having a valve member movable to occupy a first position at which fluid under pressure is conducted to the motor to cause the ram to move toward the work, a second position at which no fluid flows and the ram is immobile and a third position at wnich fluid under pressure is conducted to the motor to cause the ram to move away from the work, a shuttle, a starting lever pivoted to said frame, means acting between said lever and shuttle and procuring movement of said shuttle in opposite directions, a triple arm lever pivoted to said frame and having two actuating arms extending in opposite directions transverse to the direction of movement of said shuttle and a valve operating arm, linkage connecting said valve operating arm with said valve member, connector levers pivoted to said shuttle and extending in the same direction as the direction of movement of said shuttle, abutments on said actuating arms, abutments on said connector levers and engageable with the abutments on said actuating arms to move the valve operating arm of said triple arm lever in opposite directions, when the abutments of either arm and the corresponding connector lever are in engagement and the other abutments are out of engagement, and means operated by said shaft and engageable with either of said connector levers to hold the abutment thereof out of engagement with the abutment on the corresponding actuating arm.

3. In a power driven tool, a frame, a ram, guide means carried by said frame and guiding said ram for movement in opposite directions, a shaft journaled for oscillating movement in said frame, means acting between said shaft and ram and causing movement of said ram in opposite directions, a reversible fluid motor driving said shaft and connected to turn said shaft in opposite directions, fluid circulating means connected to said motor and to a source of fluid under pressure, valve means in said circulating means having a valve member movable to occupy a first position at which fluid under pressure is conducted to the motor to cause the ram to move toward the work, a second position at which no fluid flows and the ram is immobile and a third position at which fluid under pressure is conducted to the motor to cause the ram to move away from the work, a shuttle, a starting lever pivoted to said frame, means acting between said lever and shuttle and procuring movement of said shuttle in opposite directions, a triple arm lever pivoted to said frame and having two actuating arms extending in opposite directions transverse to the direction of movement of said shuttle and a valve operating arm, linkage connecting said valve operating arm with said valve member, connector levers pivoted to said shuttle and extending in the same direction as the direction of movement of said shuttle, abutments on said actuating arms, abutments on said connector levers and engageable with the abutments on said actuating arms to move the valve operating arm of said triple arm lever in opposite directions, when the abutmnets of either arm and the corresponding connector lever are in engagement and the other abutments are out of engagement, a shifter, guide means carried by said frame and supporting said shifter for movement transverse to the movement of said shuttle said shifter being engageable upon movement in either direction to move the abutment of either of said connector levers, out of engagement with the abutment of the corresponding actuating arm, the arm acted upon sliding relative to said shifter during swinging of said triple arm lever, and means operated by said shaft and engageable with said shifter to move said shifter in opposite directions.

4. In a power driven tool, a frame, a ram, guide means carried by said frame and guiding said ram for movement in opposite directions, a shaft journaled for oscillating movement in said frame, means acting between said shaft and ram and causing movement of said ram in opposite directions, a reversible fluid motor driving said shaft and connected to turn said shaft in opposite directions, fluid circulating means connected to said motor and to a source of fluid under pressure, valve means in said circulating means having a valve member movable to occupy a first position at which fluid under pressure is conducted to the motor to cause the ram to move toward the work, a second position at which no fluid flows and the ram is immobile and a third position at which fluid under pressure is conducted to the motor to cause the ram to move away from the work, a shuttle, a starting lever pivoted to said frame, means acting between said lever and shuttle and procuring movement of said shuttle in opposite directions, a triple arm lever pivoted to said frame and having two actuating arms extending in opposite directions transverse to the direction of movement of said shuttle and a valve operating arm, linkage connecting said valve operating arm with said valve member, connector levers pivoted to said shuttle and extending in the same direction as the direction of movement of said shuttle, abutments on said actuating arms, abutments on said connector levers and engageable with the abutments on said actuating arms to move the valve operating arm of said triple arm lever in opposite directions, when the abutments of either arm and the corresponding connector lever are in engagement and the other abutments are out of engagement, a shifter, guide means carried by said frame and supporting said shifter for movement transverse to the movement of said shuttle, said shifter being engageable upon movement in either direction to move the abutment of either of said connector levers, out of engagement with the abutment of the corresponding actuating arm, the arm acted upon sliding relative to said shifter during swinging of said triple arm lever, fingers attached to said shaft, and engaging means movable with said shifter and engaged by said fingers to move said shifter in opposite directions.

5. In a power driven tool, a frame, a ram, guide means carried by said frame and guiding said ram for movement in opposite directions, a shaft journaled for oscillating movement in said frame, means acting between said shaft and ram and causing movement of said ram in opposite directions, a reversible fluid motor driving said shaft and connected to turn said shaft in opposite directions, fluid circulating means connected to said motor and to a source of fluid under pressure, valve means in said circulating means having a valve member movable to occupy a first position at which fluid under pressure is conducted to the motor to cause the ram to move toward the work, a second position at which no fluid flows and the ram is immobile and a third position at which fluid under pressure is conducted to the motor to cause the ram to move away from the work, a shuttle, a starting lever pivoted to said frame, means acting between said lever and shuttle and procuring movement of said shuttle in opposite directions, a triple arm lever pivoted to said frame and having two actuating arms extending in opposite directions transverse to the direction of movement of said shuttle and a valve operating arm, linkage connecting said valve operating arm with said valve member, connector levers pivoted to said shuttle and extending in the same direction as the direction of movement of said shuttle, abutments on said actuating arms, abutments on said connector levers and engageable with the abutments on said actuating arms to move the valve operating arm of said triple arm lever in opposite directions, when the abutments of either arm and the corresponding connector lever are in engagement and the other abutments are out of engagement, a shifter, guide means carried by said frame and supporting said shifter for movement transverse to the movement of said shuttle, said shifter being engageable upon movement in either direction to move the abutment of either of said connector levers, out of engagement with the abutment of the corresponding actuating arm, the arm acted upon sliding relative to said shifter during swinging of said triple arm lever, fingers attached to said shaft and adjustable angularly with respect to one another and the shaft, locking means for locking said fingers from movement relative to the shaft, and engaging means movable with said shifter and engaged by said fingers to move said shifter in opposite directions.

6. In a power driven tool having a frame, a ram, guide means carried by said frame and guiding said ram for movement in opposite directions, a liquid operated motor connected to said ram and reversible to cause the ram to move in opposite directions, reclaimed liquid circulating means connected to said motor, a source of pressure connected in said circuit and providing liquid under pressure to operate said motor, a by-pass circuit connected to said source of pressure, flow restricting means in said by-pass circuit controlling the rate of flow therethrough and correspondingly the rate of movement of said ram, manual control means for varying the degree of restriction of said flow restricting means, the combination of a shut-off valve in said by-pass circuit for shutting off or causing flow through said by-pass circuit and having a reciprocable valve member movable in a direction at right angles to the direction of movement of said ram, a reciprocable cam follower movable in the same direction as said valve member, a toggle linkage between said valve member and cam follower comprising two links pivoted to said valve member and cam follower, a pivot between said links, a lever pivoted to said frame and extending transversely of the direction of movement of said ram, a link pivoted to one end of said lever and to the pivot of said toggle linkage, a cam carried by said ram and engageable with said cam follower to move said valve member into closing positions when the ram reaches a predetermined position in its power stroke and the arms of the toggle linkage are in alignment and a pusher carried by said ram and engaging the other end of said lever to cause said link to move the links of the toggle linkage out of alignment and open the valve when the ram reaches the end of its power stroke and resilient means moving said arms back into alignment and without closing the valve when the pusher leaves said lever and the cam leaves said cam follower.

7. In a power driven tool having a frame, a ram, guide means carried by said frame and guiding said ram for movement in opposite directions, a liquid operated motor connected to said shaft and reversible to cause the ram to move in opposite directions, reclaimed liquid circulating means connected to said motor, a source of pressure connected in said circuit and providing liquid under pressure to operate said motor, a by-pass circuit connected to said source of pressure, flow restricting means in said by-pass circuit controlling the rate of flow therethrough and correspondingly the rate of movement of said ram, manual control means for varying the degree of restriction of said flow restricting means, the combination of a shut-off valve in said by-pass circuit for shutting off or causing flow through said by-pass circuit and having a reciprocable valve member movable in a direction at right angles to the direction of movement of said ram, a reciprocable cam follower movable in the same direction as said valve member, a toggle linkage between said valve member and cam follower comprising two links pivoted to said valve member and cam follower, a pivot between said links, a lever pivoted to said frame and extending transversely of the direction of movement of said ram, a link pivoted to one end of said lever and to the pivot of said toggle linkage, a guide carried by said ram and extending in the direction of movement thereof, a cam slidably mounted on said guide and engageable with said cam follower to move said valve member into closing positions when the ram reaches a predetermined position in its power stroke and the arms of the toggle linkage are in alignment and a pusher slidably mounted on said guide and engaging the other end of said lever to cause said link to move the links of the toggle linkage out of alignment and open the valve when the ram reaches the end of its power stroke, resilient means moving said arms back into alignment and without closing the valve when the pusher leaves said lever and the cam leaves said cam follower, and locking means for locking said cam and pusher in various positions relative to said ram.

References Cited in the file of this patent

UNITED STATES PATENTS

| 1,582,468 | Heald et al. | Apr. 27, 1926 |
| 2,161,375 | Monroe | June 6, 1939 |
| 2,192,778 | Stacy | Mar. 5, 1940 |
| 2,282,977 | Mast | May 12, 1942 |
| 2,599,781 | Rhodes | June 10, 1952 |
| 2,780,269 | Hill | Feb. 5, 1957 |

FOREIGN PATENTS

| 843,487 | Germany | July 10, 1952 |